United States Patent [19]

Kerrigan et al.

[11] 3,996,564
[45] Dec. 7, 1976

[54] INPUT/OUTPUT PORT CONTROL

[75] Inventors: Michael Kerrigan, Wappingers Falls, N.Y.; Gerald Lebizay, Nice, France; Olin Lowe MacSorley, Lake Katrine; Alfred Weiss, Poughkeepsie, both of N.Y.

[73] Assignee: International Business Machines Corporation, Armonk, N.Y.

[22] Filed: June 26, 1974

[21] Appl. No.: 483,464

[52] U.S. Cl. ............................................ 340/172.5
[51] Int. Cl.² ........................................ G06F 13/00
[58] Field of Search ................................. 340/172.5

[56] References Cited
UNITED STATES PATENTS

| | | | |
|---|---|---|---|
| 3,363,234 | 1/1968 | Erickson et al. | 340/172.5 |
| 3,411,144 | 11/1968 | Rausch | 340/172.5 |
| 3,488,634 | 1/1970 | Mager | 340/172.5 |
| 3,593,302 | 7/1971 | Saito et al. | 340/172.5 |
| 3,643,223 | 2/1972 | Ruth et al. | 340/172.5 |
| 3,668,650 | 6/1972 | Wang | 340/172.5 |
| 3,745,532 | 7/1973 | Erwin | 340/172.5 |
| 3,771,136 | 11/1973 | Heneghan et al. | 340/172.5 |
| 3,821,715 | 6/1974 | Hoff, Jr. et al. | 340/172.5 |
| 3,828,326 | 8/1974 | Cash | 340/172.5 |
| 3,842,405 | 10/1974 | Key et al. | 340/172.5 |

Primary Examiner—Charles E. Atkinson
Assistant Examiner—Errol A. Krass
Attorney, Agent, or Firm—Roy R. Schlemmer, Jr.

[57] ABSTRACT

An input-output port control subsystem for use with a computer system having separate source and destination buses incorporated therein. Said system including circuitry for controlling operations of said system and said input/output subsystem, said subsystem including a bidirectional input/output bus for transferring data to and from said system, and separate gating means for selectively connecting said source and destination buses to said bidirectional I/O bus. External devices are connected to said bus thru an adaptor unit which is directly connected to said processing system by appropriate control lines. The input/output subsystem is adapted to operate either under programmed I/O control mode thru the central processing system or in cycle steal mode wherein the I/O devices themselves request cycle steal service time on the I/O bus thru their connected adaptor.

2 Claims, 4 Drawing Figures

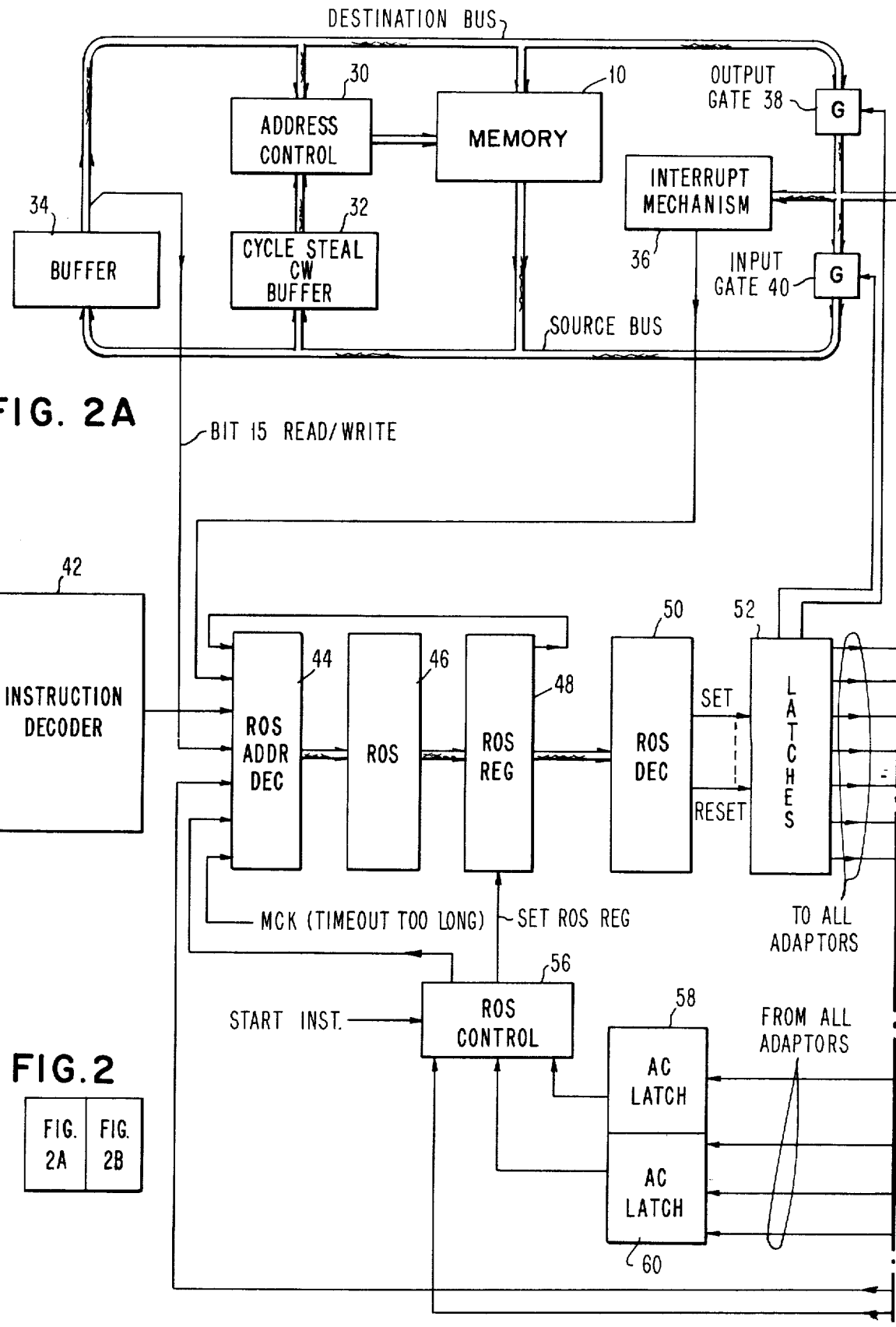

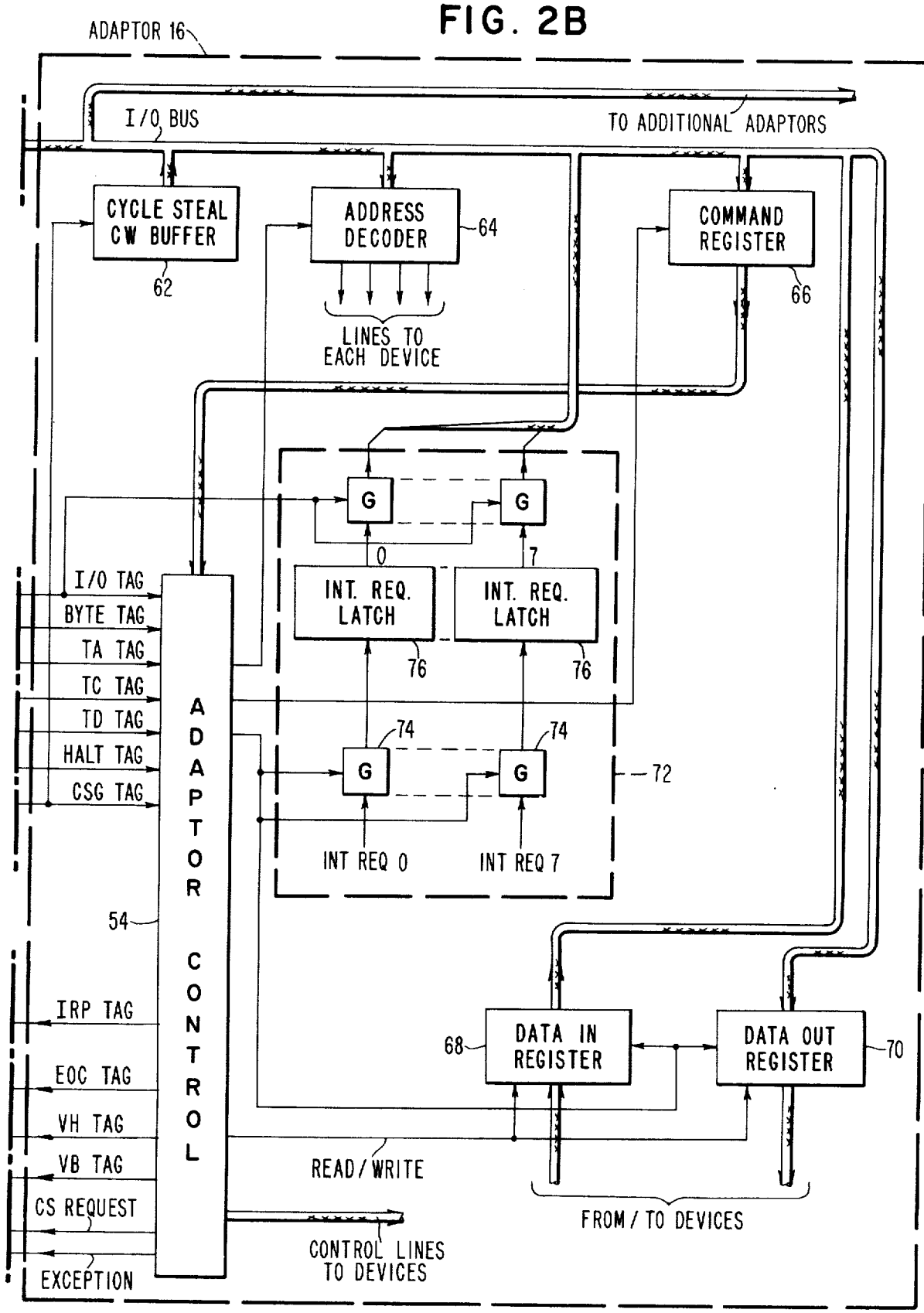

INPUT/OUTPUT PORT CONTROL

BACKGROUND OF THE INVENTION

In computer systems in general and in small systems in particular, it is desirable to reduce the total amount of hardware required for the system consistent with some specified level of machine performance. Data lines connecting various external devices such as keyboard terminals, CRT displays, credit card readers, etc., to a central processor would normally require separate I/O pin connections for each data line. In modern computers, large scale integrated circuitry (LSI) is widely used and, as is well known, these circuit modules are limited in the number of external circuit connections or pins which can be placed on an LSI module. Hence, by utilizing the same data lines for both input and output, the number of pins required is cut in half. In large, high speed computing systems, it generally has not been feasible to utilize the same data lines for both reading data into and out of the system, as many operations are held up pending the termination of an existing operation. While such waiting is necessary with a central memory or other shared functional unit, it is not so critical within the CPU as modern computers have extremely high speed memory circuits, etc., capable of performing required operations in extremely short periods of time. However, with smaller lower speed computers where both cost and manufacturing feasibility are primary factors, and time is somewhat secondary, it becomes possible to consider bidirectional data lines or half-duplex type of operations.

With the advent of modern integrated circuits and micro electronic technology, it has been possible to construct relatively small inexpensive computers utilizing separate source and destination buses within the computers which allows for considerably higher speed operations without greatly increasing the cost of construction. However, in the past, such two bus computers required large numbers of terminal pins for connecting the computer to both the input and output data lines. As stated previously, this causes severe pin connection problems when LSI is used in the host computer. It is the purpose of the present invention to provide a solution to the terminal or pin connection problem.

It has been found that satisfactory overall system performance is possible with a bidirectional data bus connected to a small two separate internal bus computer system by providing internal gating and control means for selectively connecting the I/O bus to the source and destination bus of said computer utilizing internal control circuitry together with a special adaptor connecting I/O devices to the I/O bus and for effecting requisite I/O control.

It has been further found that the requisite control functions can be efficiently and inexpensively performed by the use of micro programs stored in a read only memory having special decoding and control circuitry for effecting the desired gating operations.

OBJECTS OF THE INVENTION

It is accordingly a primary object of the present invention to provide an input output port control subsystem for allowing the connection of a bidirectional data I/O bus to a central computing system having separate source and destination buses.

It is a further object of the invention to provide such a subsystem whose operation is controlled by a set of microinstructions stored in the central computer's microprogram memory.

It is yet a further object to provide such a subsystem including two primary gates for gating data from the system destination bus out to the bidirectional I/O bus and for connecting the data from the bidirectional I/O bus to the system source bus.

It is a still further object of the invention to provide such a subsystem wherein said two primary gates are controlled by decoding circuitry connected to the output of said microprogram memory, the appropriate instructions of which are accessed under cycle steal or programmed I/O modes of operation.

These and other objects of the invention will be apparent from the following more particular description of the preferred embodiment of the invention as illustrated in the accompanying drawings.

BRIEF DESCRIPTION OF THE DRAWINGS

FIG. 2 comprises an organizational drawing for FIGS. 2A and 2B.

FIGS. 2A and 2B comprise a combination logical schematic and functional block diagram of the preferred embodiment of the present invention showing the details of the hardware necessary to effect the present input/output port control subsystem.

DESCRIPTION OF THE PREFERRED EMBODIMENT

Figure 1:
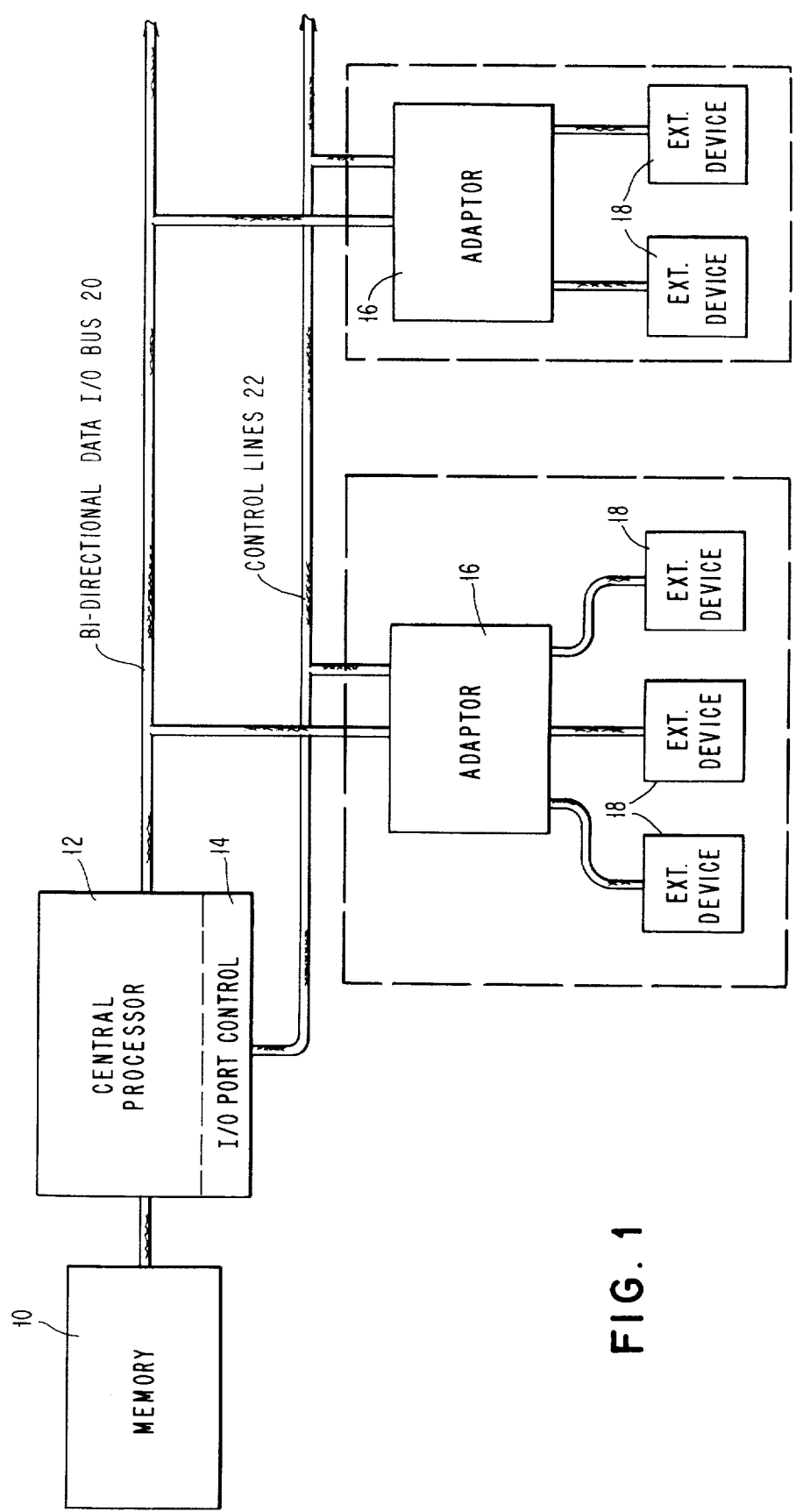
FIG. 1 comprises a high level functional block diagram illustrating the overall configuration of the present I/O port control subsystem with a plurality of adaptors attached to the bidirectional I/O bus wherein a plurality of separate devices are shown attached to each adaptor.

The objects of the present invention are accomplished in general by a data processing system comprising a plurality of input-output devices connected to a central processor by a bus containing a plurality of bidirectional data lines and a plurality of control lines, means for effecting the bidirectional operation of said data lines between selected ones of said devices and said controller by controllable assignment of the data function of said data lines to perform addressing and transfer of commands and data comprising a first controlled driver gate for selectively connecting said I/O lines to a source bus internal to said central processor to provide selected inputs to functional units therein. A second controlled driver gate is provided for selectively connecting a destination bus internal to said processor to said I/O data lines, said internal functional unit outputs being selectively connected to said destination bus. Input/output control subsystem means are provided internal to said processor responsive to I/O programmed instruction or external device generated interrupts or cycle steal requests for operating said driver gates and the selection of said inputs to and outputs from said functional units of said system and said external devices tpo perform the desired I/O operations.

The present input-output port control subsystem concept may be incorporated in at least two data bus central computing system and it is to be understood that the present invention is limited thereto. Accordingly, only as much detail of the general hardware of the central system as is needed will be shown and discussed. These include, as stated before, a read only memory utilized as a microprogram store in the present embodiment and associated decoding circuitry therefor as well as the central system memory from and into which I/O data is read as well as the source and destination buses.

The disclosed embodiment illustrates a terminal driven system. In such a system, the various terminals, such as keyboards, credit card readers, etc., actually initiate operation of the system by signalling interrupts or requests for cycle steal at predetermined priority levels.

The present I/O port control interface operates in program controlled mode or in cycle steal mode wherein it is controlled by hardware in the external devices which can use memory faster than normal programmed I/O.

The following is a general overview of the system organization referring to FIG. 1 in which the central memory 10 is shown connected generally to the central processor 12 which, should be clearly understood, defines a two internal data bus system having separate source and destination buses. At the lower portion of block 12, the I/O port control 14 is indicated as being a portion of the central processor, since the I/O port control will use the system microprogram store which in the disclosed embodiment is a read only store (ROS). Similarly, the output from the main ROS decoder and control unit will cause the requisite control latches of the present port control subsystem to be brought up to set the various tag lines going out to the external device adaptor units 16 through which the external devices 18 are connected to the main data bus 20. Additionally, a control bus 22 is shown connected between the I/O port control 14 and the various adaptors 16. As will be explained subsequently with respect to the description of FIG. 2, this control bus comprises a series of fixed lines going to the various adaptors in parallel. In the present embodiment, these are unidirectional lines and are not operated bidirectionally as with the data bus 20.

By use of the disclosed system, the I/O port control allows the central processor to communicate with designated devices and certain devices to communicate with the central processor thru the necessary gating circuits over the I/O data bus onto the source bus or from the destination bus onto the data bus as required by a particular operation being processed. It also includes controls required to prevent conflicts from occurring, i.e., one device trying to transmit while another one is trying to transmit or when the processor is attempting to communicate with a device.

Before proceeding with a detailed description of the operation of the specifically disclosed functional hardware elements shown in the block diagram of FIG. 2, there follows a general description of the operation of the system.

The objective of the present I/O port control design is to accomplish the following two functions. The first is to perform the control of I/O in an asynchronous manner. The second is to allow sharing of I/O control mechanisms and the I/O bus for programmed I/O, UC cycle steal, and interrupt signalling.

FIGS. 2 (2A and 2B) shows the I/O port control circuitry of the central processor and the I/O bus with one adaptor attached. The I/O bus contains 16 bidirectional lines, a high byte and a low byte, each 8 bits wide. When the system is not performing a cycle steal or programmed I/O operation, the low byte of the I/O bus is used to send interrupt requests from the adaptor to the central processor. When the I/O bus is being sampled for interrupts by the system, the TD tag is used to inhibit changing the interrupt request latches during the sampling interval. In order to begin a programmed I/O instruction or cycle steal operation, the I/O tag is raised early in these operations to free the I/O bus (i.e., the interrupt requests are inhibited).

The central processor is a microcoded machine in which each operation has a beginning address (instruction decode) in ROS which can only be followed by a fixed number of other ROS patterns until the instruction is completed. The ROS REG output sends out control signals over the tag lines within the machine for fixed intervals of time except for I/O and cycle steal operations. For these operations, the set ROS REG line is inhibited from gating the ROS REG out within specified patterns until certain conditions are satisfied by the adaptor. This allows these operations to be carried out faster by faster adaptors and slower by slower adaptors. There is a limit to how long the system will wait for a response from an adaptor and when this time limit is reached, the central processor will go into its machine check stop sequence (MCK). The halt tag will be raised to signal the adaptor when this occurs. This is a diagnostic which detects a malfunction of some sort and may do any one of many things including something as simple as a 'retry' of the last operation.

The central processor can operate over the I/O bus with either one byte or two bytes of data depending on the type of device and/or the operation. There are two programmed I/O instructions: IO and IOH. IO can be used to read or write bytes of data to a byte or halfword (HW) device while IOH can only be used with a HW device. An IO write operation takes data out of memory and sends it to the adaptor over the IO bus. An IO read takes data from the IO bus and stores it in memory.

In both instructions, IO and IOH it is necessary to send the address of the device and the command (read or write) to the external device before data is read or written. The address and command are each byte information and therefore must be sent individually to byte devices whereas they can be sent at the same time for HW devices. As an example of how the procedure works, assume an IO write instruction to a byte device is required. The instruction decode sends out the initial ROS pattern for the IO instruction. During this initial pattern the I/O and byte tages are activated to free the I/O bus and the gate to the IO bus from the buffer output is opened. The contents of memory at a location specified by the instruction are being sent out of memory to the buffer and the output of the buffer is connected to the I/O bus. The memory content has the address of the device on the high byte (bits 0–7) and the command on the low byte (bits 8–15). The adaptor responds to the I/O tag by dropping VB (valid byte-byte adaptor) to signal that interrupts have been removed from the I/O bus and that the adaptor is a byte adaptor. The central processor then raises the TA tag to tell the adaptor that the address of a device is on the high byte of the I/O bus (and also that the command is on the low byte for a HW adaptor). The adaptor then responds by raising VB to indicate that a valid address was transmitted by the central processor. This return of valid resets the TA tag and now the command is transferred to the high byte out of the buffer and out to the I/O bus. Also, the adaptor must deactivate VB as a result of the TA tage being reset. When VB is deactivated, the TC tag is raised to tell the adaptor that the command is on the high byte of the I/O bus. VB is activated to tell the central processor that the command has been stored in the command REG and that TC tag can be reset. Bit 15 out of the buffer is checked to see whether the command is read or write so that the correct microcode pattern is decoded.

As a result of the TC tag being reset, VB is deactivated. Now data is read from a memory location specified by the instruction decode and is sent through the buffer out to the high byte of the I/O bus. TD tag can be raised after VB is deactivated to tell the adaptor that the data is on the high byte of the I/O bus. When the data is stored in the 'data in' REG by the adaptor, VB is activated to signal the central processor that the adaptor has the data. Next the I/O and byte tags are reset to signal that the I/O instruction is completed and the IRP line if used is deactivated to signal that interrupts are back on the bus.

For HW devices, the TC tag is not required since the device can read the address and command at the same time. Timeout can only occur while the central processor is waiting for a response from VB tag, VH tag, IRP tag, and EOC tag. The exception line is used during cycle steal to inhibit timeout.

The only extra lines required to accomplish cycle steal are CS request, CSG tag, and EOC tag. Cycle steal is initiated by the adaptor and therefore does not require an address. Instead a control word is sent from the adaptor to the central processor. This control word contains information to tell the central processor whether a read or write should be done, and a starting address for the address control, and for direct byte transfer, which byte to begin reading or writing. The purpose of cycle steal is to read or write many bytes or halfwords of data at a rapid rate. The cycle steal request line can be activated at any time, but is ignored until the completion of the present instruction being executed in the central processor. When this instruction is finished, the central processor is ready to begin cycle steal and the cycle steal initial ROS pattern causes the I/O tag to activate. This frees the I/O bus and a valid (byte or HW) must deactivate to indicate this is done. Then the central processor raises cycle steal grant (CSG tag) to indicate it is ready to receive the control word. The valid tag (VB or VH) must be returned to indicate that the control word is on the bus.

After the initial address is stored in the address control, the address is updated by one for byte data transfers or by two for HW data transfers until EOC tag (end of chain) activates to signal that the adaptor has completed cycle steal. Before this, the TD tag was used in the same manner as programmed I/O for data. The end of cycle steal is similar to the end of programmed I/O. Another cycle steal request can follow a cycle steal operation or the central processor will return to its next instruction.

The AC latches for input tags from the adaptor to the central processor are used to prevent the central processor from responding to noise pulses which might appear on these lines.

In summary, a fairly extensive description has been given to show how two objectives have been accomplished. The diagram only shows one adaptor for simplicity which can have several devices attached, but the machine can have several adaptors each with several devices and therefore it is necessary for a particular system configuration to determine how it will use the address information.

Referring to FIG. 2 (FIGS. 2A and 2B), the individual blocks will be described relative to the functions performed thereby. In the upper portion of FIG. 2A, there appears the source and destination bus of the host computer system. Similarly, the memory 10 is the same as that shown in FIG. 1. The address control 30 performs conventional addressing routines and includes the memory address register. It additionally has features for doing indexing operations. The cycle steal CW buffer 32 is a conventional control word buffer wherein this control word is transferred from the cycle steal CW buffer 62 in the adaptor and utilized to control the cycle steal operations.

The buffer 34 is a conventional memory buffer for receiving data from and storing data in the memory 10. Interrupt mechanism 36 receives and analyzes interrupt requests and contains the necessary logic controls for selecting the interrupt request with the highest priority. It will be readily understood that there are many types of interrupt systems available in the computer arts and could be as simple as a prewired interrupt priority wherein particular devices will have priority over all other devices or some other more complex scheme. The type envisioned in the present system is a simple prewired priority wherein the raising of particular data lines during an interrupt call indicates priority designations of particular external device connected to the data bus through its particular adaptor.

The gates 38 and 40 are the primary data gates for transferring data from the destination bus to the I/O bus or from the I/O bus to the source bus respectively. The instruction decoder 42 is a conventional instruction decoder connected to the instruction register (not shown) and as far as the present invention is concerned only those functions applying to the present invention are shown. The line shown going from the instruction decoder 42 to the ROS address decoder 44 is active when a programmed I/O operation is called for. This, as will be apparent from the subsequent description, selects a particular beginning address in the ROS which address is accessed and subsequent commands are read out until the particular I/O operation called for is completed. The ROS address decoder is similarly activated when a cycle steal type of operation is required. The ROS 46 is completely conventional and reads out into the ROS register 48. The output of this register goes into the ROS decoder 50, the output lines of which in turn are connected to the block marked latches 52 which will raise or lower one or more of the output tag lines from this block. The two output lines from block 50 labelled Set and Reset would set or reset all of the latches whereas the intermediate lines, indicated by the dotted lines, set selected ones of the tag lines which in turn are fed into the adaptor control block 54. The adaptor control block operates in a conventional manner to perform the usual handshaking operations between the external devices and the central processor and also contains the controls to set up the cycle steal mode of operation in the preferred embodiment disclosed herein. In other words, when one of the tag lines comes up from the latches 52, the adaptor control signals that a certain operation is to be performed by the external device and when this opertion has been performed, the device notifies the adaptor control and the VH or VB tag is raised indicting the particular operation has been performed and notifies the ROS control 56 that the next instruction is needed. The adaptor control block consists essentially of latches and timing circuitry which accept and pass on the various control signals from the control system and the devices, and automatically provides for the requisite time to complete the called for operation. The two blocks 58 and 60 at the bottom of FIG. 2A, designated the AC latches, are for the purpose of holding their outputs up when a specific signal is received on the one of the four tag lines going into these blocks from the adaptor control and are designed such that random noise appearing on these lines cannot cause erroneous operation of the ROS control 56.

As will be apparent from the subsequent description, the presently disclosed system includes an operation called cycle steal wherein a particular device requests a rather lengthy chain of data from memory at consecutive address locations. Under the cycle steal operation, it is not required that each data word transferred from memory go through a complete access request but instead the complete chain of data is either read into or out of memory until the chain is completed at which point the cycle steal operation is terminated and the system returns presumably to standard programmed I/O. This will however be discussed in further detail subsequently. The cycle steal CW buffer 62 comprises part of the cycle steal mechanism just mentioned and is utilized during the cycle steal operation.

The address decoder 64 stores an address and decodes the address to identify the particular device which is being addressed by the system. An output line goes from the address decoder to each individual device indicating that it has been selected. The command register 66 is for the purpose of storing a particular command for the devices. The command may include a read/write particular command, goes thru the adaptor control 54 and then to the data in and data out registers 68 and 70 which could either be located in the individual external devices or be common to the adaptor. However as will be apparent a single pair of such registers could be utilized with appropriate gating utilized in conjuction with the address decoder so that any given device could utilize these data registers and thus avoid a duplication. The command may include a number of other device dependent operations, which may or may not include data transfer per se. However, for the purpose of explaining the overall operation of the present I/O port control subsystem, the read/write operation is the most general. The dotted block marked 72 comprises the interrupt request mechanism where it will be noted that the gates 74 will be energized when a particular external device requests an interrupt from the system. It will further be noted that there are as many of the gates 74 as there are devices. The gates 74 feed into the interrupt request latches 76 for the obvious purpose of holding the lines up for a predetermined time. It should be noted that one or more of the interrupt request latches could be set at a given time and in accordance with the present embodiment a particular one of the data lines in the I/O bus is energized. Thereby, the system will decide which of the external devices is to receive service at a particular time.

The preceding description of the detailed hardware of FIGS. 2A and 2B clearly describes the particular functions performed by each of the disclosed blocks. The following description of the operation of this system and the control line table will more clearly set forth the interrupt operation and cycle steal sequences included therein.

The following table shows the function of each of the control lines which directly connect the adaptor devices with the central processor. These lines are dedicated to one way communication in the disclosed embodiment although they could be made bidirectional with the addition of appropriate program support and hardware gating controls. However, the disclosed embodiment is preferred. The direction of the signal flow on these lines is clearly shown in the table (i.e., central processor to adaptor or vice versa).

It should be understood that the circuitry of the adaptor controls are configured in a conventional manner so that various operations may occur on either the rise or fall of the control tag and valid lines. This is conventionally accomplished by taking control from either the 'set' or 'reset' side of a flip-flop.

| TABLE OF CONTROL LINE FUNCTIONS | |
| --- | --- |
| Lines | Functions Served |
| I/O TAG (Central Processor → Adaptor) | Frees I/O bus of signals from interrupt request latches. Opens gate from destination bus to I/O bus for "write" Indicates I/O instruction completed. Indicates starting of CS instruction. |
| BYTE TAG (Central Processor → Adaptor) | Indicates byte operation. |
| TA TAG (Central Processor → Adaptor) | Tells adaptor that high data byte contains an address (and that command is on low byte for a HW adaptor). Indicates that command is shifted to "high byte" data lines (for a byte adaptor. |
| TC TAG (Central Processor → Adaptor) | Indicates command is on "high byte". Indicates command is stored. (Not required for HW adaptors which can read address and command at same line.) |
| TD TAG (Central Processor → Adaptor) | Inhibits changing of interrupt request latches in adaptor during sampling of interrupt lines. Indicates data is on high byte. In cycle steal, indicates data |

-continued
TABLE OF CONTROL LINE FUNCTIONS

| Lines | Functions Served |
|---|---|
| HALT TAG (Central Processor → Adaptor) | is on bus. Tells adaptor that the count limit has been exceeded for VB or VH or IRP or EOC response from adaptor, or internal latch (any MACH CHK that would cause a level of interrupt). |
| IRP TAG (Adaptor → Central Processor) | Indicates that interrupts are on bus. |
| VH TAG (Adaptor → Central Processor) | Same as VB for a half word device. |
| VB TAG (Adaptor → Central Processor) | Indicates interrupts are removed and device is a byte device. Indicates receipt of a valid address. Indicates command stored in command register 66. Indicates adaptor has stored data. In cycle steal, indicates that control word is on I/O bus. |
| CS REQ (Adaptor → Central Processor) | Indicates a request for cycle steal. (Initiated by adaptor - ignored until an instruction has been completed) |
| CSG TAG (Central Processor → Adaptor) | Indicates processor is ready to receive cycle steal control word (CSCW). |
| EOC TAG (Adaptor → Central Processor) | Indicates end of cycle steal chain. |
| EXC (Adaptor → Central Processor) | Inhibits timeout during CS. |

TABLE OF DATA LINE FUNCTIONS (I/O BUS)

| Lines | Functions Served |
|---|---|
| HIGH 0 – 7 "data" (Central Processor → Adaptor) | High byte "write" data to HW adaptor. Device address for byte operation. Byte data to byte adaptor. |
| HIGH 0 – 7 "data" Adaptor → Central Processor) | High byte "read" data from HW adaptor. Byte data from byte adaptor. |
| LOW 8 – 15 "data" (Central Processor → Adaptor) | Low byte "write" data to HW adaptor command for byte operation. |
| LOW 8 – 15 "data" (Adaptor → Central Processor) | Interrupt requests from adaptor (when not in CS or I/O mode). Low byte "write" data from HW adaptor. |

The following are brief descriptions of the interrupt system utilized to give service to requesting external devices and the cycle start operation itself which allows relatively large strings of data to be read into or out of the system without individual hand shaking operations between memory cycles.

I/O INTERRUPT

The following description assumes one possible wired in interrupt priority scheme where the raising of a particular data line (lines) automatically signals the level of the interrupt. This I/O interrupt scheme works in two steps assuming there are several devices on any given interrupt level. First, the I/O bus is examined to see which levels are up. There may be several devices requesting service on any given level. Determination of the highest requesting level is done in conventional decoding circuitry. A software routine is then invoked to poll the highest up level to find out which devices want service at that level. (If there is more than one device on any level, these devices must operate from "special" adaptors which will also use the I/O bus to indicate, during a polling interval, that they want service). If, for example, a 4 is the highest requesting level, the program is then switched to level 4 I/O, and an instruction is performed on the data lines. Any of the adaptors have the ability to put an adaptor identifying signal on a signal I/O line to identify that they want service under their interrupt. The data bus is read out and a further instruction determines which devices at level 4 want service. The devices are then taken in a predetermined sequence until all level 4 interrupts have been serviced and then lower level interrupts will be serviced.

CYCLE STEAL (CS)

When a Cycle Steal Adaptor raises the CS Request (CS Req) line, a latch is set at the EXIT of the instruction currently in process. This causes the ROS address register to be loaded with the CS microprogram initial address. The I/O line is raised which indicates to the adaptor that the controller has entered the CS routine. The adaptor raises a valid line (VB or VH) which is acknowledged by the Cycle Steal Grant (CSG) line.

The Adaptor then places the Cycle Steal Control Word (CSCW) on the I/O Bus. The CSCW is gated to the CSCW buffer 32 by an appropriate gating operation.

The CSCW identifies whether the operation is to be read or write (Address Bus Bit 8), it provides an initial address in mmemory 10. Subsequent read or write cycles are addressed by the memory address control 30 until Adaptor has completed the desired number of cycles, at which time it raises the EOC line. This causes a termination of the cycle steal microprogram. The address of the last instruction completed before the cycle steal operation began is loaded back into the memory address register and normal programmed I/O may be resumed or another cycle operation may be initiated.

The preceding description of the present I/O port control system clearly illustrates the general applicability of the concept. While the disclosed embodiment shows a microprogrammed central processor with a read only store (ROS), it will be apparent that a conventional stored program central processor utilizing central memory for resident control programs could be suitably modified. Also, many variations of the interrupt mechanism and cycle steal operations could be used. The broad concept disclosed is that of the port control mechanism which provides suitable gating paths and controls internal to the central processor to allow the selective connection of the internal source destination buses to the I/O data lines for the required transfer of both data and command information as needed.

What is claimed is:

1. In a data processing system including a central processor having an addressable read/write memory, a plurality of addressable working registers, an arithmetic and logical processing unit, a first internal bus, a second internal bus, and an instruction register said data processing system further including a plurality of external input/output devices connectable to said central processor by way of a bidirectional input/output (I/O) bus containing a plurality of data lines and a plurality of control lines, the improvement which comprises:

an input/output port control subsystem including port control means in said central processor, for controlling bidirectional data flow over said data lines between selected ones of said external devices and said processor, by the controllable assignment of said data and control lines to perform the necessary transfer of input/output service requests, addresses, commands and data, said subsystem including adaptor means for connecting individual external devices to said bidirectional bus including control means for receiving device commands from the port control means and for transferring said commands between said external devices and said port control means, said adaptor means further including a first command word register means for storing lower priority commands utilized for controlling the operation of said external devices and a second command word register means for storing commands to be transferred to said central processor on a high priority basis, means for initiating a high priority microprogram sequence in response to a command in said second command word register, for sequentially gating a predetermined block of data between said central processor and a particular external device without checking for pending service requests between each read transfer operation and means for returning control to normal interrupt procedures upon the completion of the transmission of said block of data;

said port control means further including a first control driver gate means for selectively connecting said I/O data lines to said first internal bus to effect a data transfer in a first direction, a second control driver gate means for selectively connecting said I/O data lines to said second internal bus to effect data transfer in the opposite direction, microprogram sequence control means including a series of selectively accessible microprogram sequences stored in said central processor and means responsive to a particular I/O service request for accessing and decoding a particular microprogram sequence to perform a desired I/O operation, said, means responsive further including, means operative under the control of said microprogram sequences accessed in response to service commands received from either the processor or the external devices for selectively actuating either of said control driver gates and selecting inputs to and outputs from said addressable working registers and memory in order to perform specified input/output operations.

2. A data processing system as set forth in claim 1, wherein said system includes a plurality of further adaptors connected in parallel to said I/O bus and wherein each adaptor has at least one external device connected thereto, means in said input/output port control subsystem for selectively addressing a particular adaptor and external device connected thereto, when a service request relating to said external device is detected by the system, each said adaptor further including an interrupt control mechanism including setable latch circuit means for each external device connected to said adaptor wherein an interrupt request from a given external device will cause a particular latch to be set, and means for periodically monitoring said latches to determine which external device is to receive service at a particular time.

* * * * *

UNITED STATES PATENT AND TRADEMARK OFFICE
CERTIFICATE OF CORRECTION

PATENT NO. : 3,996,564

DATED : December 7, 1976

INVENTOR(S) : Michael Kerrigan, Gerald Lebizay, Olin Lowe MacSorley and Alfred Weiss It is certified that error appears in the above-identified patent and that said Letters Patent are hereby corrected as shown below:

Column 2, line 57, change "instruction" to --instructions--;

Column 3, line 8, change "keybords" to --keyboards--;

Column 4, line 49, line 49, change "tages" to --tags--;

Column 11, line 9, after "until" insert --the--;

line 30, before "destination" insert --and--;

Column 12, line 9, before "for" insert -- means --.

Signed and Sealed this

Tenth Day of May 1977

[SEAL]

Attest:

RUTH C. MASON
*Attesting Officer*

C. MARSHALL DANN
*Commissioner of Patents and Trademarks*